Sept. 28, 1971     R. H. PHILLIPS     3,608,336
TIMING CONTROL DEVICES
Filed April 10, 1969     4 Sheets-Sheet 1
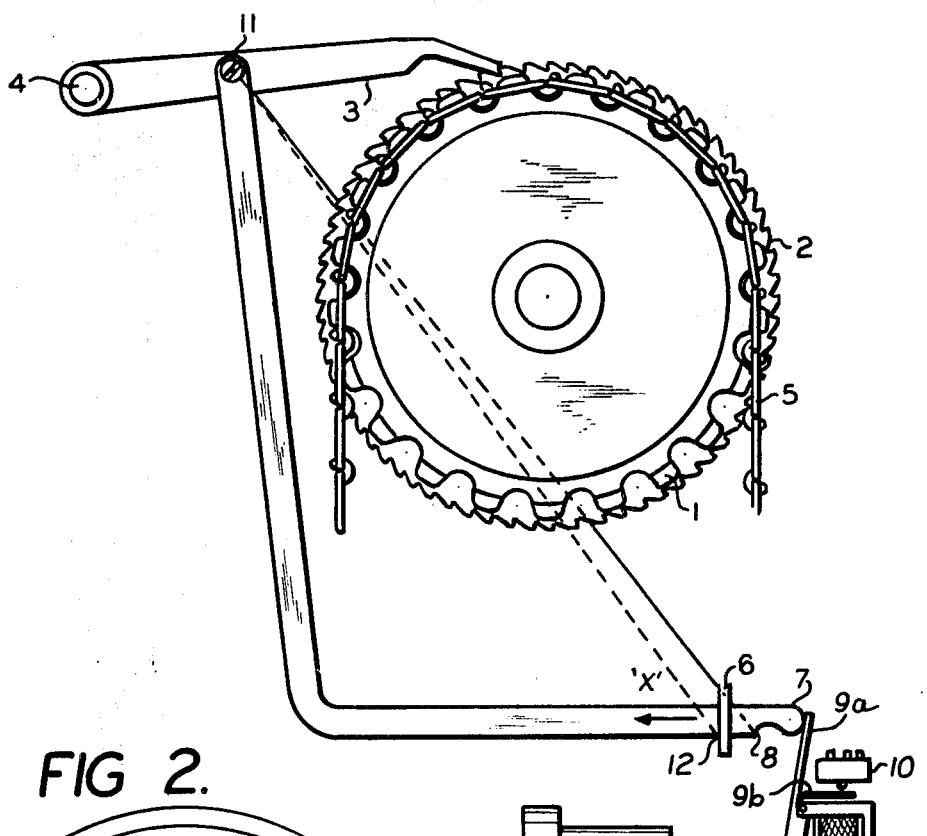
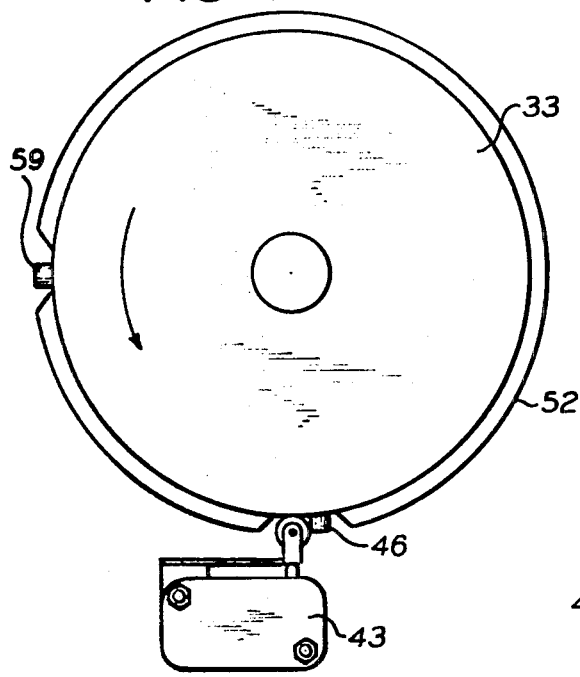
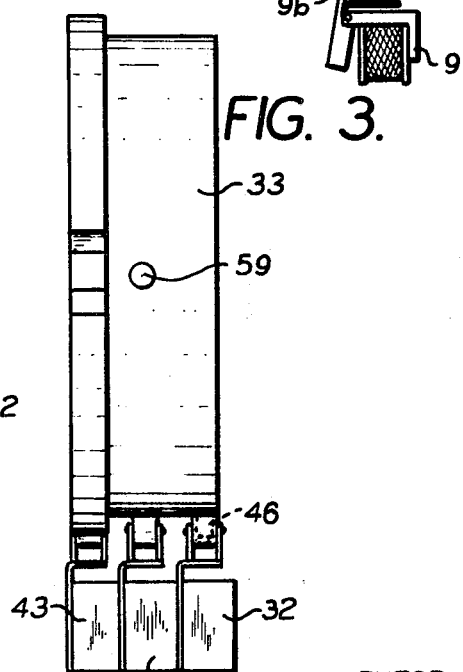
INVENTOR
RAYMOND HENRY PHILLIPS
BY Burgess, Dinklage & Sprung
ATTORNEYS.

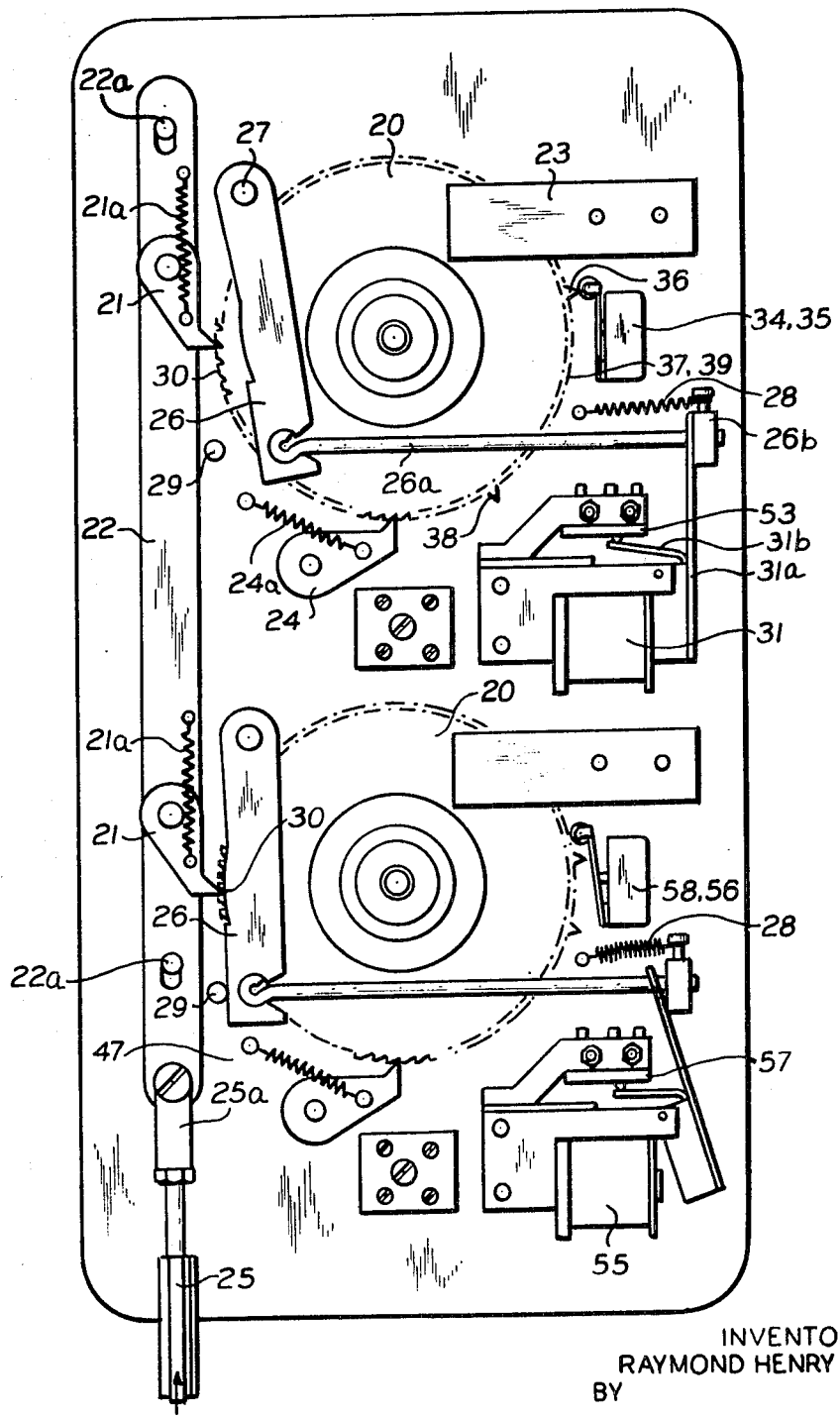

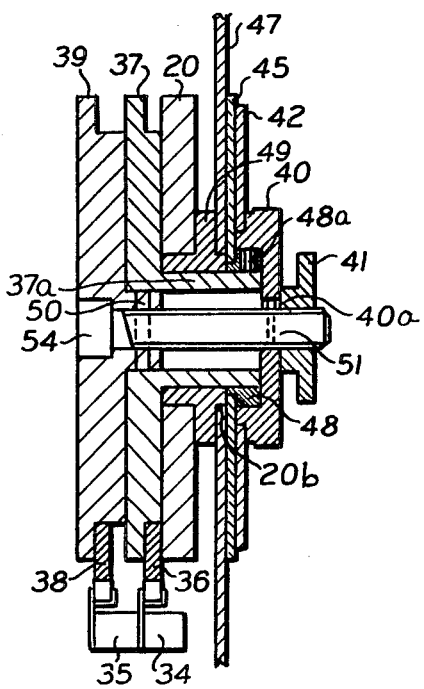
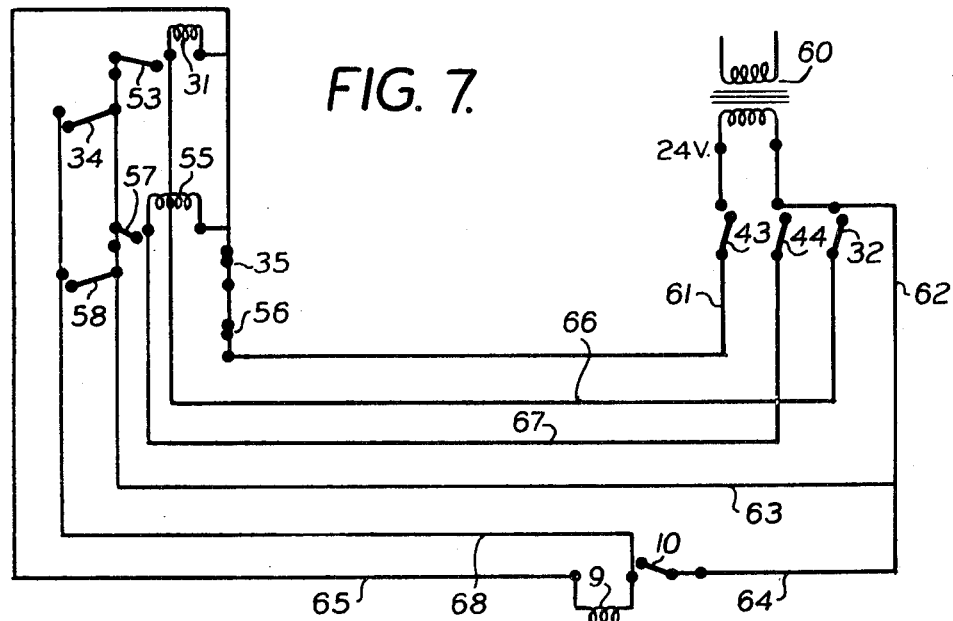

United States Patent Office 3,608,336
Patented Sept. 28, 1971

3,608,336
TIMING CONTROL DEVICES
Raymond Henry Phillips, Birstall, Leicester, England, assignor to The Bentley Engineering Company Limited, Leicester, England
Continuation-in-part of abandoned application Ser. No. 432,987, Feb. 16, 1965. This application Apr. 10, 1969, Ser. No. 815,141
Int. Cl. D04b 15/00
U.S. Cl. 66—155          5 Claims

ABSTRACT OF THE DISCLOSURE

A timing control device suitable for arresting over continuously adjustable periods, the racking of a control chain of a knitting machine wherein one or more rack wheels each with a setting dial and associated racking means and bluffing means is adapted to control by cam projections and micro switches the bluffing and freeing of racking means for the control chain or like control member. Each of said rack wheels is adjustable as to its starting setting over a continuous range indicated on the associated dial and its bluffing means is released electromagnetically from a main control.

---

This application is a continuation-in-part of my co-pending application Ser. No. 432,987 filed Feb. 16, 1965 now abandoned.

This invention is for improvements in or relating to timing control devices and has for one of its objects to provide means whereby a succession of mechanical controlling movement to be instigated at timed intervals may have the intervals between at least certain of said movements varied in a simple and convenient manner.

In accordance with the invention there is provided in association with a control member normally arranged to be racked at regular intervals and to give rise to controlling movements at preset intervals, means for exerting a superposed control whereby the racking of the control member may be arrested for a timed period between preselected actuations, and means for adjusting said superposed control means to vary the period of arrestment to a preset extent. There is thus provided an overriding control which can be simply adjusted in a convenient manner to vary the timing between preselected controlling movements to suit varying requirements. This manner of control has a particularly useful application in the control of operation of knitting machines.

It has been the practice to control knitting machines by means of a timing or pattern chain which may be composed of separate interlocking flat links upon which cam studs are formed. This chain is made up as an endless band of a predetermined length and is arranged on sprocket wheels to be racked past a cam follower which is acted upon in succession by the studs on the chain. It is usual for the chain to make a complete cycle for each separate article. When racking of the chain is started manually it continues repeating its cycle automatically The studs are positioned at intervals to activate mechanisms to rack the main control drum, introduce yarn feeder changes and any other functions in a manner well known to the trade.

The step by step movement of the chain occurs in a definite relationship to the revolutions of the needle cylinder. That is, for each link which is racked past the aforementioned cam follower a certain number of revolutions of the needle cylinder are made. It therefore follows that the number of knitted courses making up the length of an article are in direct proportion to the number of links in the chain.

When using a chain for controlling hosiery machines it is usual for the operator to regulate the length of the leg portion and the foot portion of the article to be knitted by adding or removing links in the appropriate sections of the chain. A typical machine constructed to make ladies hose may knit as many as twenty four courses to each chain link. The number of courses knit in one revolution of the needle cylinder depends on the number of knitting stations and therefore the addition or removal of links involves some calculation on the part of the operator as to the number of courses it will affect, especially when several machine of different types are involved. In addition to the calculation required, stoppage of the machine and also risk of error make this method of regulating the length of portions of a knitted article a time consuming operation demanding experienced labour. In its preferred form the present invention provides an attachment which may be readily fitted to existing or new machines, by which the number of courses in any portion (e.g. welt, leg and foot) of a knitted article can be readily and quickly varied, merely by the adjustment of a dial, without stopping the machine or interfering with the mechanical adjustment.

Although special mention has been made of the use of this invention with respect of the regulation of numbers of courses of knitted fabric, it should be emphasized that this is but one application. The basic function of the mechanism is to provide a control unit by which the time span between one mechanical action and another may be varied simply by adjustment of a dial.

A specific form of the invention as applied to a knitting machine for knitting hose will now be described in detail with reference to the drawings in which:

FIG. 1 is a side elevation of a conventional chain wheel assembly with a micro-switch and solenoid control according to the invention.

FIG. 2 is a side elevation of a cam drum assembly which is attached to the main control drum of the machine.

FIG. 3 is a front elevation of the parts shown in FIG. 2.

FIG. 5 is a front elevation of the control unit with the cover and dials removed.

FIG. 6 is a side elevation in section on the line VI—VI in FIG. 4 showing the assembly of the dials.

FIG. 7 is a wiring diagram.

Figure 4:
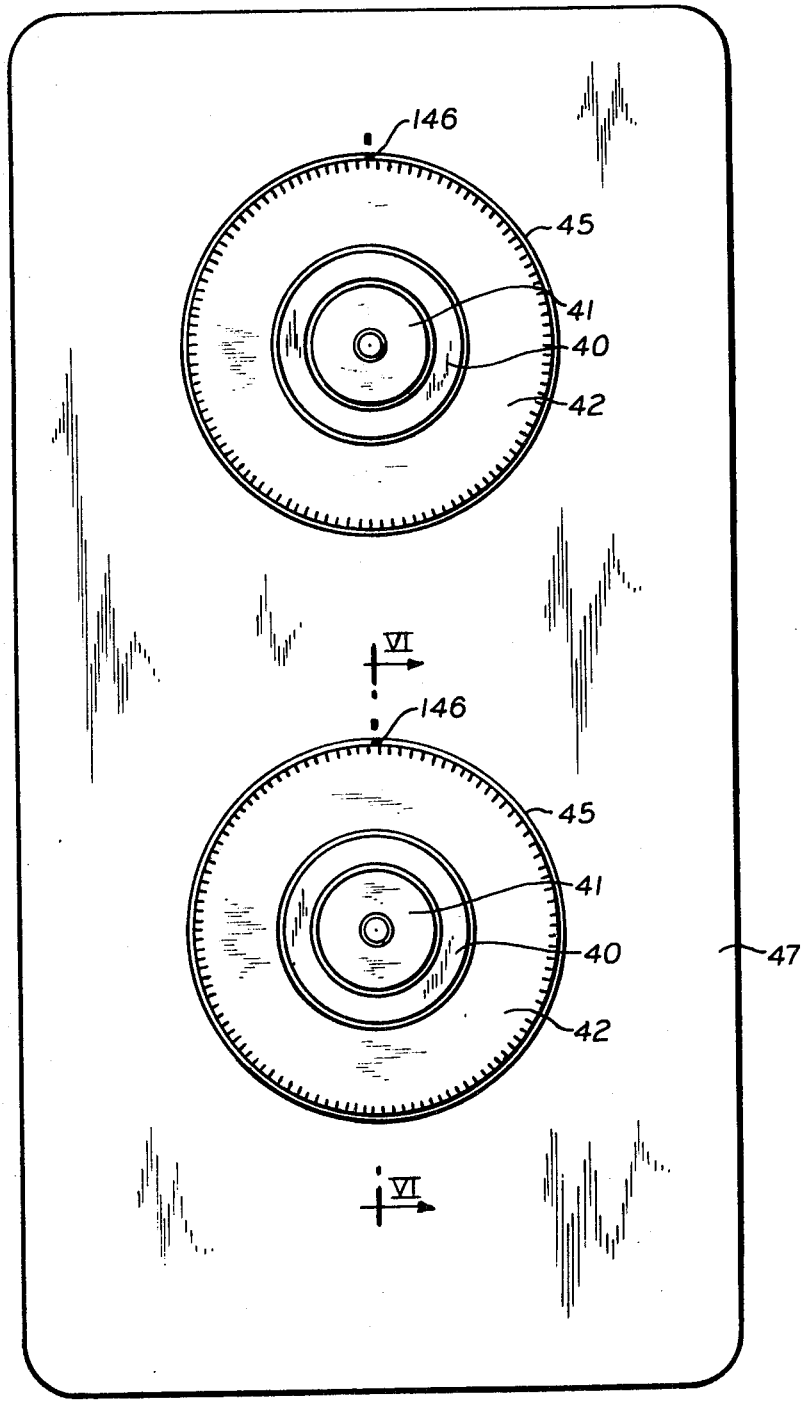
FIG. 4 is a front elevation of the control unit showing the dials.

As shown in the drawings, a chain wheel 1 (FIG.1) has attached thereto a rackwheel 2 which is engaged by a pawl 3 carried for reciprocating action on a spindle 4. The pattern chain is indicated as 5. Attached to pawl 3 by a pivot pin 11 is an L-shaped idling bar 7 which is carried at its lower end in a guide 6. Movement of idling bar 7 is the direction of arrow X acts to lift the pawl 3 out of engagement with the rackwheel 2. A solenoid 9 is arranged adjacent to the lower end of the idling bar 7 so that upon energising the solenoid a lever 9a is forced into contact with bar 7 to bluff the pawl 3.

The bar 7 is provided with a catch 8 which, if the bar is moved sufficiently will engage at the point 12 with guide 6 to lock the pawl in the bluffed position. This locking is only achieved manually. The movement of the solenoid 9 is sufficient to bluff the pawl but not sufficient to engage the catch. Thus, upon manual release of idling bar 7, racking of the chain will continue until the solenoid 9 is energised. The control unit which energises this solenoid for the desired periods will now be described.

FIG. 5 shows the interior of a unit arranged with two similar control mechanisms each having a dial (as shown in FIG. 4) one of which controls the number of courses knit in the leg and the other controls courses in the foot.

A slide member 22 is guided on studs 22a which are secured in the casing of the unit and a link 25 and coupling 25a connect the member 22, through an opening in the casing, to a reciprocating part of the machine.

Attached to the reciprocating member 22 are two pawls such as 21 each being urged by a spring 21a into contact with a rack wheel such as 20. As the mechanism associated with each rack wheel is identical, the description will refer to the upper one shown in FIG. 5. A check pawl 24 with spring 24a is provided to control the wheel on the return stroke of the racking pawl 21, and a leaf spring 23 is arranged to prevent frictionally any unwanted movement.

Associated with pawl 21 is a bluff lever 26 pivoted at 27 and controlled through a link rod 26a which passes through an aperture in an arm 31a attached to the plunger of a solenoid 31. An adjustable collar 26b is secured to the link rod 26a. The solenoid 31 is shown in its energised state in which it has pulled on the link 26a to pivot the bluff lever 26 to allow the pawl 21 to engage the rackwheel. A tension spring 28 is provided to return the bluff lever when solenoid 31 is de-energised. The movements just described may be more clearly understood if comparison is made between the upper and lower similar mechanisms shown in FIG. 5. The lower mechanism shows the solenoid 55 de-energised and the bluff lever inactivating the pawl 21. A stop pin 29 is provided to limit the extent to which the spring 28 can urge the bluff lever.

Briefly recapitulating, there is provided a unit containing two constantly reciprocating pawls each associated with a rack wheel and each provided with a bluff lever controlled by a solenoid. Upon energising the solenoid the bluff lever is moved to allow the pawl to rack the rack wheel. The parts associated with the rack wheel will now be described with reference to FIGS. 4 and 6.

A bearing is provided in the front 47 of the unit casing, by the bushing 49, which is spigoted in a hole and secured by screws. The rack wheel 20 is screwed to a face of a cam plate 37 which is provided with a hub 37a which is free to rotate in the bush 49. A collar 48 is clamped by a screw 48a to the end of the hub 37a projecting from the front 47 of the casing, to retain the rack wheel and cam plate assembly in the bearing bushing 49. The collar 48 has a spigot formed on its inner face to which a dial 45 (FIGS. 4 and 6) is secured. Thus when the rack wheel 20 is rotated by the pawl 21 (FIG. 5) it carries with it also the cam plate 37 and the dial 45. Co-axial with the rack wheel assembly is a second camplate 39 which is journalled in the camplate 37. A screw 54 extending through the centre of the camplate 39 is secured therein by a pin 50, its threaded portion projecting through the rack wheel assembly (FIG. 6). A knurled collar 40 having a plain hole with a keyway 40a is located on the thread of screw 54 and has its keyway engaged with a peg 51 projecting from the screw. The knurled collar is provided with a spigot upon which a second dial 42 is secured. A knurled locking nut 41 completes the assembly.

Cam plates 37 and 39 have annular recesses formed in their rims to which are attached respectively cams 36 and 38 (FIGS. 5 and 6). Cam 36 is therefore attached to the rack wheel assembly having a dial 45, and cam 38 is attached to the co-axial assembly having the dial 42 fixed to the knurled collar 40, the two assemblies being locked together by the knurled nut 41 are free to rotate in the bearing bushing 49. Upon slackening the nut 41 it is possible to rotate the cam 38 with respect to the cam 36 by means of the knurled collar 40, the relative displacement being indicated by the graduations on dial 42 moving with respect to a datum line 146 on dial 45. When the nut 41 is tightened the two cams are fixed relatively so that they revolve together with the rack wheel. Arranged side by side in the unit casing are two microswitches 34 and 35 (FIG. 5). These switches are positioned to be engaged respectively by cams 36 and 38 (FIG. 6). The mechanism comprising the control unit assembly, which has just been described constitutes the means by which the time span between one mechanism action and another may be varied by adjustment of a dial as aforesaid. It is, of course necessary that this timing unit is "triggered off" at the appropriate times and this is achieved in the following manner.

Arranged on the main control drum of the knitting machine, or on a short drum 33 (as shown in FIGS. 2 and 3) which is attached to the main drum, are three cam tracks, and associated therewith are three stationary microswitches 32, 43 and 44.

The sequence of events is as follows: At the start of a knitted hose the pattern chain is set in motion by manually unlatching the idling bar 7, FIG. 1. The pattern chain is of the minimum length required to produce the shortest length hose. After the welt portion has been knit a stud on the chain initiates a rack of the main drum which advances a cam 52 from under the micro-switch 43 thus actuating it to supply electrical power to the system (FIGS. 2 and 3). This same movement of the drum causes cam 46 to be moved completely past microswitch 32 providing an impulse to energise momentarily the solenoid 31 associated with the bluff lever 26 FIG. 5. Movement of the solenoid plunger causes a projecting arm 31b to contact micro-switch 53 which sustains current in the solenoid after the cam 46 on the control drum, FIG. 2, has released its associated switch 32.

It should be mentioned here that the rack wheel 20 is provided with one tooth 30 which is lower than the rest and the bluff lever 26 is positioned when sprung to its stop 29 so that it masks this low tooth. This is the idle position of the control unit in which the dial 45 is set with the datum line 146 in register with a suitable mark on the unit cover (FIG. 4). The energising of solenoid 31 causes the bluff lever 26 to be moved to expose the low tooth of rackwheel 20 and allow the pawl 21 to commence racking. After two racks the cam 36 (FIGS. 5 and 6) will brush past micro-switch 34 thus energising solenoid 9, FIG. 1, to bluff the pattern chain pawl 3. Movement of the solenoid plunger causes a projecting arm 9b to contact micro-switch 10 which sustains current in the solenoid after cam 36 (FIG. 5) has released its associated switch 34. The rack wheel 20 is allowed two racks before cam 36 operates solenoid 9 in order to ensure that the pattern chain stud is racked from under its follower before the pawl 3 FIG. 1 is bluffed, otherwise further racks of the drum would take place.

The pattern chain is now idle, the period of idleness being controlled by the racking of the rack wheel 20 in the control unit and the displacement of cam 38 with respect to cam 36 as indicated by the preset dial 42. When the requisite number of courses has been knit the cam 38 will brush past switch 35 which cuts off the current to solenoid 9 to release the idling bar 7 and commence racking of the pattern chain by pawl 3 (FIG. 1). The actuation of switch 35 by cam 38 also cuts off the current to solenoid 31 thus allowing the bluff lever 26 to spring back to stop 29. Racking of the wheel 20 by pawl 21 continues on the full height teeth until the low tooth is brought under the bluff lever thus interrupting racking at the start of another cycle.

The pattern chain will continue its step by step movement until a stud for the foot section causes a rack of the main drum 33 and a repeat of the events described, but with the over-riding control secured by the lower mechanism shown in FIGS. 4 and 5 and with the period of idleness of the chain determined by the presetting of the lower dial appropriate for the foot. At this stage the cam 52 will have been racked round to bring its gap appearing at the left side of FIG. 2 into register with the micro-switch 43 to actuate the latter so as to supply electric power to the system. Also a cam 59 on the drum 33 (FIGS. 2 and 3) will be moved past microswitch 44 causing an impulse for energising the solenoid 55. Energisation of solenoid 55 of the lower control mechanism in FIG. 5 causes a corresponding sequence of actions to occur with the bottom control unit as has already been described in relation to the top control unit. That is to say energisation of solenoid 55 will be maintained by means of micro-switch 57 and micro-switches 58 and 56 will be actuated by pre-set cam projections on the lower rack wheel 20 to perform corresponding functions to the micro-switches 34 and 35.

The circuit connections are shown in FIG. 7, the electrical system being supplied by a mains energised transformer 60 the output from which at 24 volts energises lines 61 and 62, the normally open micro-switch 43 being interposed in the input to line 61. Beyond micro-switch 43 line 61 is connected through normally closed micro-switches 56 and 35 arranged in series to common terminals of solenoid coils 55 and 31. This line is continued through lead 65 through one terminal of solenoid coil 9. The other terminal of this coil is connected through the normally open maintaining micro-switch 10 and by a lead 64 to the line 62. The line 62 is also connected through a lead 63 to normally open micro-switches 58 and 34 which are in parallel and are connected through a further lead 68 to that terminal of solenoid coil 9 which is connected to micro-switch 10. Initial energisation of solenoid 9 is thus effected by closure of either of switches 34 and 58 after the appropriate one of the rack wheels 20 has been moved through a preliminary number of racking steps, for the reason, aforementioned, and solenoid 9 is then maintained energised by switch 10. From the lead 63 circuit connections also go via normally open maintaining microswitches 57 and 53 to the other terminals of solenoid coils 55 and 31. Finally the leads 66 and 67 run from micro-switches 30 and 44 respectively to the solenoid coils 31 and 55 convey the initial impulses which energise those solenoids from the racking movement of the control drum 33. It will be noted that the whole electrical system is de-energised as soon as either of the switches 35 and 56 is opened.

It will be obvious that the scope of a control unit of the type described may be enlarged by the addition of similar mechanisms, housed if required in the same casing and each having separate dials. It is also obvious that the various electrical components could be replaced by mechanically operated links, levers and Bowden cables if the circumstances were more suitable to such an arrangement.

What I claim is:

1. A timing control device for a knitting machine comprising a rotatable control member, means mounting said control member for rotation, racking means for racking the control member at regular intervals, means actuated by said control member for effecting control movements at pre-set intervals, a plurality of over-riding control means each including (a) a rack wheel equipped with two cam projections adjustable therearound, (b) adjusting indicator dials associated with said cam projections and movable therewith and with the rack wheel, (c) rack arresting and restoring means for the control member racking means operated respectively by said cam projections and (d) means for operating said rack wheel, whereby racking of the control member may be arrested for a timed period between pre-selected racking motions, and means for actuating said over-riding control means at different times to arrest racking of the control member for separately timed periods.

2. A timing control device for a knitting machine comprising a rotatable control member, means mounting said control member for rotation, racking means for racking the control member at regular intervals, means actuated by said control member for effecting control movements at pre-set increments of movement of the control member, first and second over-riding control means each including (a) a step by step movable member, (b) two cam projections adjustably mounted on said step by step movable member, (c) indicators associated with the cam projections to indicate the positions thereof on the step by step movable member, (d) rack arresting and restoring means for the control member racking means and operated respectively by said cam projections and (e) means for initiating operation of said step by step movable member, whereby racking of the control member may be arrested for a timed period between preselected racking motions, and constantly operated timing racking means common to the first and second over-riding control means for advancing the step by step movable members thereof towards limiting positions.

3. In a hosiery knitting machine, the combination comprising a pattern chain, a chain wheel for driving said pattern chain, a rack wheel coupled to said chain wheel, a racking device for racking the rack wheel to impart increments of movement to the chain wheel and pattern chain at regular intervals, rack arresting means operable to discontinue racking of the chain wheel and pattern chain, a plurality of timing control means for bringing said rack arresting means into and out of operation at the commencements and ends of different timed periods, each of said timing control means including (a) a rack wheel equipped with two cam projections adjustable therearound (b) adjusting indicators associated with said cam projections and movable therewith to indicate their settings and (c) means operated respectively by said cam projections for bringing said rack arresting means into and out of action, and means for bringing said timing control means into action at different times to initiate discontinuance of racking of the pattern chain for separately timed periods.

4. A timing control device for a knitting machine comprising a rotatable control member, means mounting said control member for rotation, racking means for racking the control member at regular intervals, rack-arresting means operable to discontinue racking of the control means for bringing said rack-arresting means into and out of operation at the commencement and end of two separate timed periods, said timing control means including (a) two rack wheels each equipped with a cam projection adjustable therearound, (b) adjustable indicators associated respectively with the cam projections on the rack wheels and movable to indicate the positions of the cam projections, (c) a constantly oscillating racking member associated with both rack wheels for imparting racking movements thereto, (d) bluffing means associated with each rack wheel for disconnecting the rack wheel from the racking member and (e) means including a solenoid for selectively operating each of the bluffing means, and means for actuating said control means.

5. A timing control device according to claim 4 wherein the means for operating the bluffing means includes two solenoids associated respectively with the bluffing means of the two rack wheels, and separate energising circuits for said solenoids.

References Cited

UNITED STATES PATENTS

| | | | |
|---|---|---|---|
| 3,139,742 | 7/1964 | Lewis | 66—155 |
| 3,290,903 | 12/1966 | Moyer | 66—155 |

WM. CARTER REYNOLDS, Primary Examiner